United States Patent
Kwak et al.

(10) Patent No.: US 6,337,959 B1
(45) Date of Patent: Jan. 8, 2002

(54) LIQUID LEVEL DETECTOR AND LIQUID LEVEL MEASURING APPARATUS OF PRINTER ADOPTING THE SAME

(75) Inventors: Hee-guk Kwak, Suwon; Hyong-gu Lee, Kunpo, both of (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/677,177

(22) Filed: Oct. 2, 2000

(30) Foreign Application Priority Data

Nov. 24, 1999 (KR) ............................................. 99-52383

(51) Int. Cl.[7] ........................... G03G 15/10; G01F 23/26
(52) U.S. Cl. ........................ 399/57; 73/304 C; 399/237
(58) Field of Search ............................ 399/57, 27, 237; 73/304 C

(56) References Cited

U.S. PATENT DOCUMENTS

| | | | | |
|---|---|---|---|---|
| 3,580,158 A | * | 5/1971 | Scholle et al. | ............. 399/57 X |
| 5,611,240 A | * | 3/1997 | Yamaguchi | ............... 73/304 C |
| 5,613,399 A | * | 3/1997 | Hannan et al. | ........... 73/304 C |
| 5,930,555 A | * | 7/1999 | Lee | ............................ 399/57 |

* cited by examiner

Primary Examiner—Sophia S. Chen
(74) Attorney, Agent, or Firm—Sughrue Mion, PLLC

(57) ABSTRACT

A liquid level detector includes an electrode portion including a substrate, a first electrode plate separated a predetermined distance from the substrate, a hollow second electrode plate extending from the substrate to the first electrode plate and having an opening corresponding to the outer circumferential surface of the first electrode plate, and a liquid level detecting portion which detects the presence of the liquid at the detection position from a change in electrostatic capacity measured by the first and second electrode plates. Thus, the level of liquid stored in the container can be detected from outside of the container in a non-contact manner, simplifying the structure of the apparatus and preventing the generation of an error in measuring the liquid level due to ink adhering to the container.

11 Claims, 5 Drawing Sheets

LIQUID LEVEL DETECTOR AND LIQUID LEVEL MEASURING APPARATUS OF PRINTER ADOPTING THE SAME

BACKGROUND OF THE INVENTION

1. Field of the Invention

The present invention relates to a liquid level detector and a liquid level measuring apparatus of a printer adopting the same and, more particularly, to a detector for detecting the level of liquid contained in a container in a non-contact manner and a liquid level measuring apparatus of a printer adopting the same.

2. Description of the Related Art

An apparatus for measuring the level of liquid contained in a container is adopted to a liquid development type printer such as a laser printer or copying machine using ink as developer. The liquid level measuring apparatus provides information about the amount of ink stored in the container. The information about the remaining amount of ink provided by the liquid level measuring apparatus adopted to a printer is used to prevent the printer from running out of ink. Since the ink supply can be managed by adopting the liquid level measuring apparatus, incomplete printing or interruption of printing due to running out of ink can be avoided.

In the conventional optical liquid level measuring apparatus, a light source and a photodetector are provided so that the light source emits light toward a container of liquid and the amount of light reflected or passing through the container is detected to measure the level of the liquid. However, the optical liquid level measuring apparatus may cause an error in measuring the level of liquid due to ink adhering to and solidified on an inner wall of the container.

In another example of the conventional liquid level measuring apparatus, a float is installed in a container of liquid, and the vertical displacement of the float is detected to measure the level of the liquid. However, since the specific gravity varies with the liquid being measured, the float needs to be manufactured according to the specific gravity of the developer.

Also, there is another method in which two electrode plates are installed inside a container such that the liquid level is measured from the measured change in electrostatic capacity which corresponds to the change of the level of liquid contained between the two electrode plates. However, since toner often adheres fixedly to the electrode plates regardless of the change of the liquid level, an error may be generated when the liquid level is measured.

SUMMARY OF THE INVENTION

To solve the above problems, it is an object of the present invention to provide a liquid level detector which can accurately measure the level of liquid stored in a container from outside of the container, and a liquid level measuring apparatus of a printer adopting the same.

Accordingly, to achieve the above object, there is provided a liquid level detector comprising an electrode portion including a substrate, a first electrode plate, which is separated a predetermined distance from the substrate by a support bar, a hollow second electrode plate extending from the substrate to the first electrode plate and having an opening corresponding to the outer circumferential surface of the first electrode plate, and a liquid level detecting portion which detects the presence of the liquid at the detection position from a change in electrostatic capacity measured by the first and second electrode plates.

Also, to achieve the above object, there is provided a liquid level measuring apparatus of a printer which comprises a plurality of liquid level detectors, installed outside a container for storing liquid to be supplied to a developing apparatus of the printer at liquid level detecting positions set at predetermined intervals in a vertical direction, which detect a change in electrostatic capacity according to the presence of the liquid and output a corresponding signal, and a controller which controls each of the liquid level detectors so that the operation time of each of the liquid level detectors does not overlap, and which determines the level of the liquid stored in the container from the signal output from each of the liquid level detectors.

BRIEF DESCRIPTION OF THE DRAWINGS

The above object and advantages of the present invention will become more apparent by describing in detail a preferred embodiment thereof with reference to the attached drawings, in which.

DETAILED DESCRIPTION OF THE INVENTION

Figure 1:
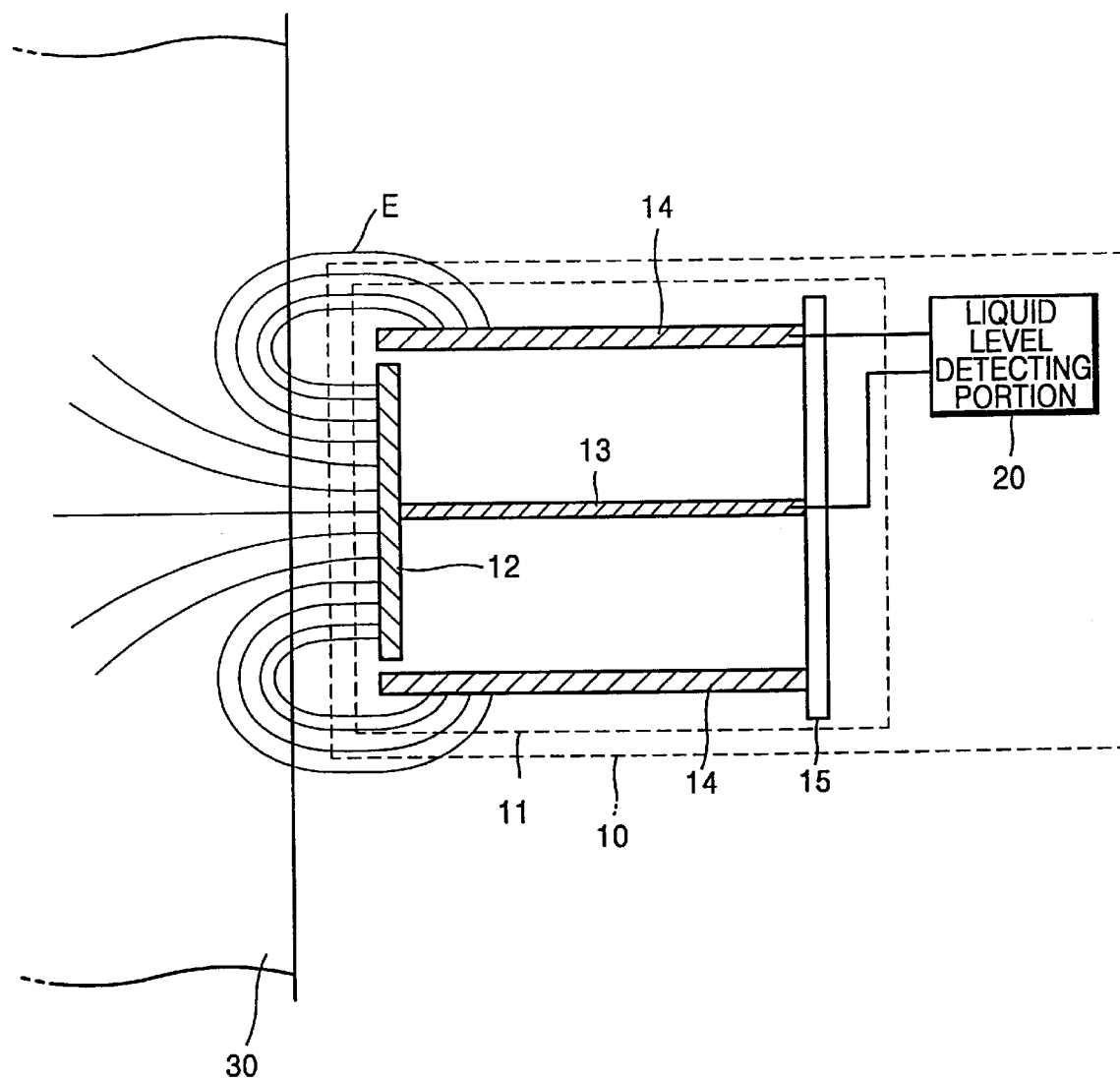
FIG. 1 is a view showing a liquid level detector according to the present invention.
Figure 2:
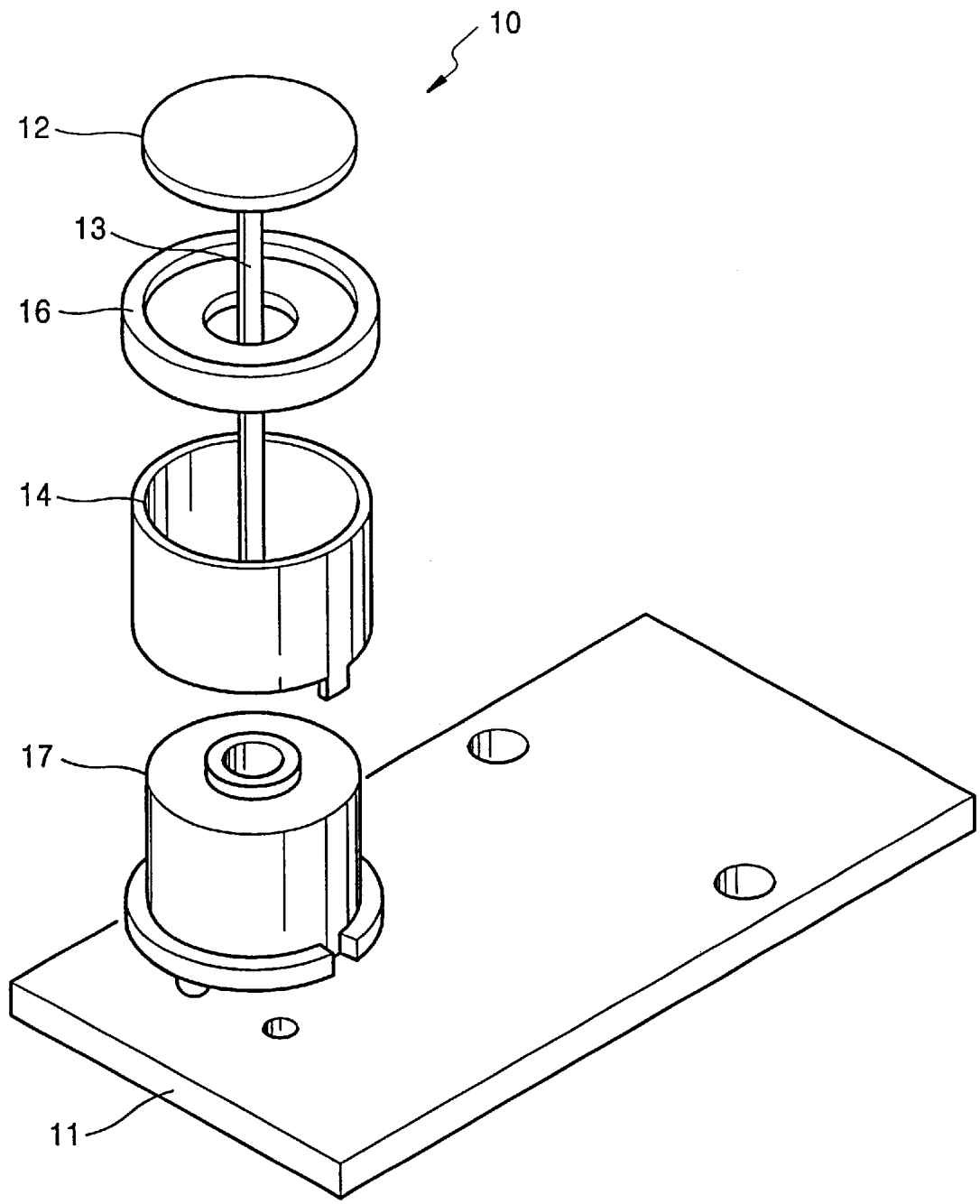
FIG. 2 is an exploded perspective view showing an electrode portion of the liquid level detector of FIG. 1 according to a preferred embodiment of the present invention.

Referring to FIGS. 1 and 2, a liquid level detector 10 includes an electrode portion 11 and a liquid level detecting portion 20. The electrode portion 11 includes a substrate 15, a first electrode plate 12, a second electrode plate 14, a separator 16 inserted between the first and second electrode plates 12 and 14, and a cylindrical bracket 17.

The first electrode plate 12 is installed, facing a container 30, to be separated a predetermined distance from the substrate 15 by a support bar 13 connecting the substrate 15 and the first electrode plate 12. The support bar 13 is formed of conductive material. The first electrode plate 12 is preferably a disk.

The second electrode plate 14 which is supported by the cylindrical bracket 17 extends from the substrate 15 around the support bar 13 to the first electrode plate 12. The second electrode plate 14 is formed such that the inner diameter of the second electrode plate 14 is greater than the outer diameter of the first electrode plate 12. The second electrode plate 14 is preferably formed to be a hollow cylinder.

In order to increase sensitivity with respect to change in electrostatic capacity between the outer circumferential surface of the second electrode plate 14 and the first electrode plate 12, the separator 16 and the cylindrical bracket 17 are preferably formed of insulating material exhibiting a low dielectric constant which can lower the electrostatic capacity between the inner surface of the second electrode plate 14 and the first electrode plate 12.

An electric field E which is generated by a voltage applied between the first and second electrode plates 12 and 14 is formed as shown in FIG. 1. Thus, as the dielectric constant varies according to the presence of liquid stored in the container 30, the electrostatic capacity thereof changes.

Figure 3:
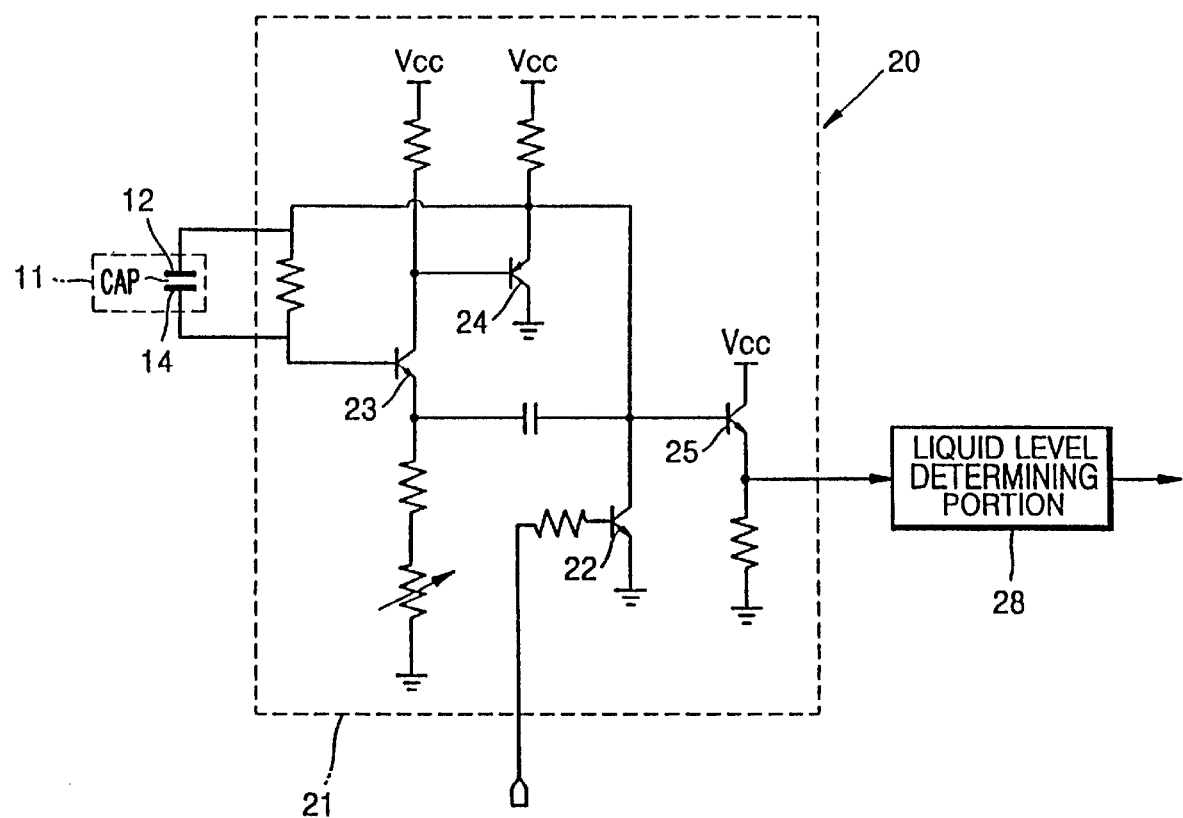
FIG. 3 is a circuit diagram showing the liquid level detecting portion of FIG. 1.

The liquid level detecting portion 20 detects the presence of liquid at the level of the liquid to be measured from the electrostatic capacity maintained by the first and second electrode plates 12 and 14. FIG. 3 shows an example of the liquid level detecting portion 20.

The liquid level detecting portion 20 includes an oscillation circuit 21 which oscillates according to the electrostatic capacity of the first and second electrode plates 12 and 14 which are equivalent to a capacitor CAP, and a liquid level determining portion 28 for determining the level of liquid from signals output from the oscillation circuit 21 and for outputting the result thereof.

The oscillation circuit 21 outputs an electric signal corresponding to the change in electrostatic capacity of the capacitor CAP which is formed by the first and second electrode plates 12 and 14. A first switch device 22 controls turning the oscillation circuit 21 on/off. A second switch device 23 and a third switch device 24 are alternately switched on and off according to the electrostatic capacity of the capacitor CAP. That is, when the first switch device 22 is turned off, the second switch device 23 is turned on. When the second switch device 23 is turned on, the capacitor CAP is charged. When the capacitor CAP approximates a predetermined electric potential, the third switch device 24 is turned on, while the second switch device 23 is turned off. When the third switch device 24 is turned on, the capacitor CAP is discharged. When the electric potential of the capacitor CAP is lowered below a predetermined level, the third switch device 24 is turned off, while the second switch device 23 is turned on. The period of alternately turning on and off between the second switch device 23 and the third switch device 24 is determined according to the electrostatic capacity of the capacitor CAP. Thus, the frequency of a signal output to the liquid level determining portion 28 through an emitter terminal of a fourth switch device 25 varies according to the presence of liquid at the position facing the first electrode plate 12.

The liquid level determining portion 28 determines the presence of liquid by comparing the signal output from the oscillation circuit 21 with a reference value set to determine the presence of liquid at the measurement position.

Figure 4:
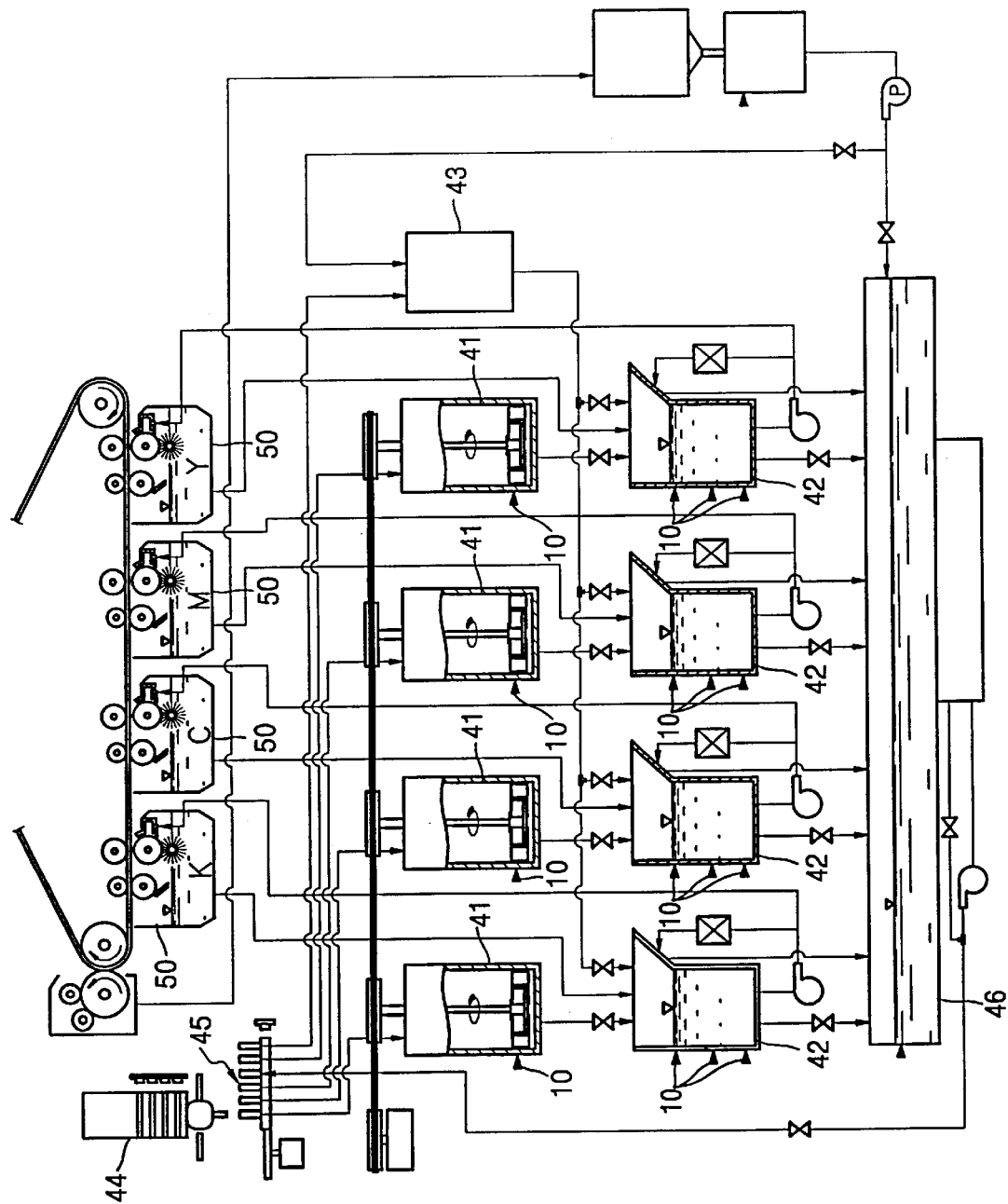
FIG. 4 is a view showing a printer to which the present invention is applied.

Referring to FIG. 4, a printer to which the present invention is applied includes a first group container 41, a second group container 42 and a solvent storing container 43 installed on a path along which developer is supplied to a developing apparatus 50. The first group container 41 is installed to independently contain highly concentrated developer for each color, including black (K), cyan (C), magenta (M), and yellow (Y), injected from a detachable supply container 44 through an injection portion 45.

The second group container 42 contains solution supplied from the first group container 41 and the solvent storing container 43 and supplies the contained solution to the corresponding developing apparatus 50. Reference numeral 46 denotes a waste developer collecting container.

Figure 5:
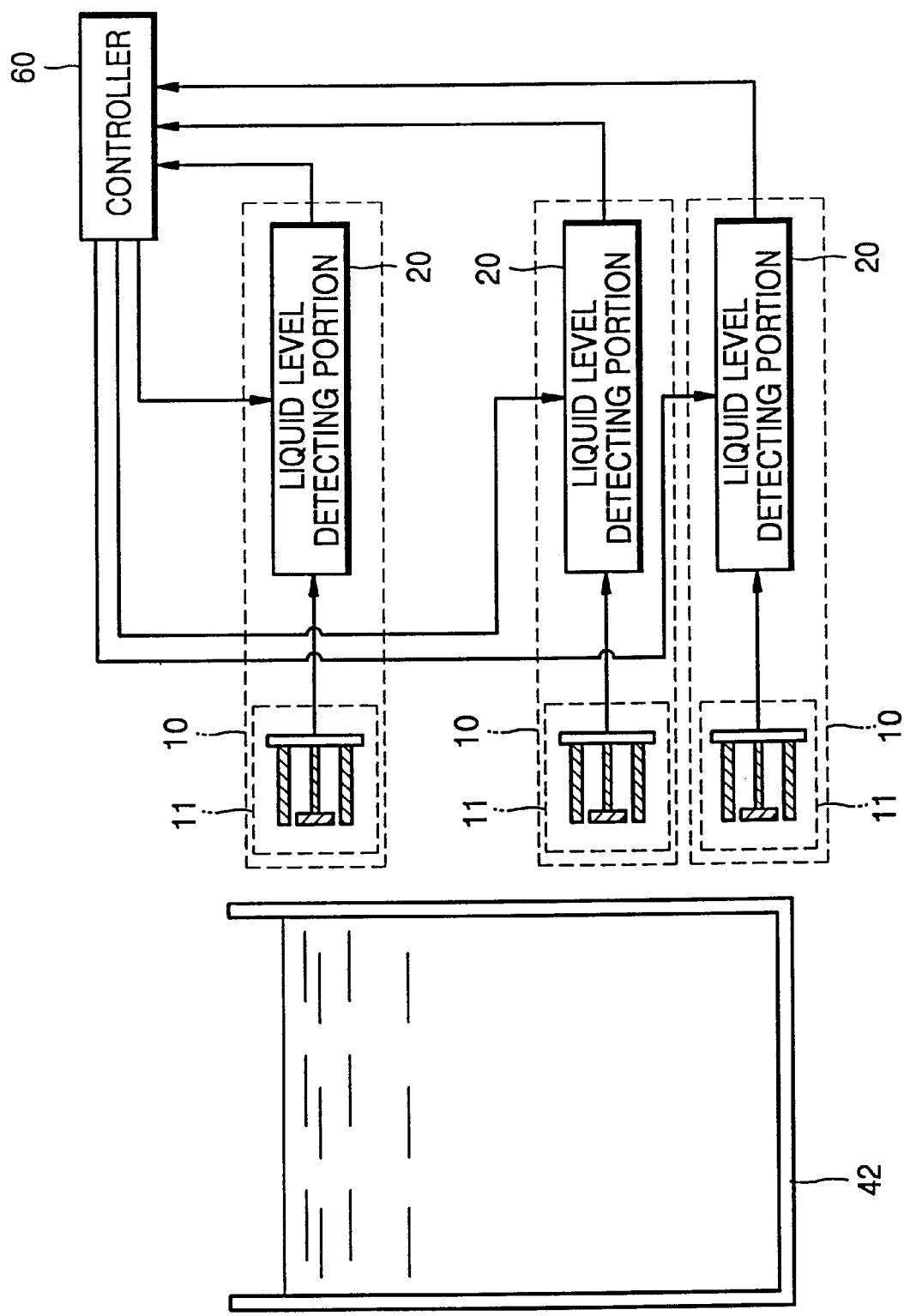
FIG. 5 is a view showing a liquid level measuring apparatus adopted to the printer of FIG. 4.

A liquid level detector 10 for detecting the level of liquid contained in the containers 41 and 42 is provided to each of the containers 41 and 42. A liquid level measuring apparatus which measures the level of liquid from the liquid level detector 10 is shown in FIG. 5. The elements having the same functions as those shown in the previous drawings are indicated by the same reference numerals.

Referring to FIG. 5, the liquid level measuring apparatus includes a plurality of liquid level detectors 10 installed vertically with respect to the container 42, and a controller 60 for controlling the operation of the liquid level detectors 10.

The liquid level detectors 10 are installed to be capable of determining the amount of solution with respect to each of a full level, a level for filling and an empty level. Alternatively, the liquid level detectors 10 may be installed only at the full level and the level for filling.

The controller 60 controls the on/off operation of each of the liquid level detectors 10 and measures the level of liquid stored in the container 42 from the information output from each of the liquid level detectors 10.

When each of the liquid level detectors 10 has the oscillation circuit 21 of FIG. 3, the controller 60 controls the on/off operation of the liquid level detectors 10 by controlling the first switch device 22.

The controller 60 operates the liquid level detectors 10 in a set order to prevent generation of an error in measurement due to interference of electric field E formed by the electrode portion 11 when the liquid level detectors 10 are concurrently operated. That is, when one liquid level detector 10 is operated, the other liquid level detectors 10 are all turned off. Then, it is determined whether liquid is present at the detection position from the signal output from the operative liquid level detector 10.

As described above, the liquid level detector and the liquid level measuring apparatus of a printer adopting the same according to the present invention simplify the structure of the apparatus and prevent generation of an error in measuring the liquid level due to the ink adhering to the container, since the level of liquid stored in the container can be detected from outside of the container in a non-contact manner.

It is contemplated that numerous modifications may be made to the liquid level detector of the present invention without departing from the spirit and scope of the invention as defined in the following claims.

What is claimed is:

1. A liquid level detector comprising:
   an electrode portion including a substrate, a first electrode plate separated a predetermined distance from the substrate, a hollow second electrode plate extending from the substrate to the first electrode plate and having an opening corresponding to the outer circumferential surface of the first electrode plate; and
   a liquid level detecting portion which detects the presence of a liquid at a detection position from a change in electrostatic capacity measured by the first and second electrode plates.

2. The detector as claimed in claim 1, wherein the first electrode plate comprises a disk.

3. The detector as claimed in claim 1, wherein the liquid level detecting portion comprises:
   an oscillation circuit portion which outputs an electric signal of a frequency corresponding to a change in electrostatic capacity of the first and second electrode plates; and
   a liquid level determining portion which determines the presence of the liquid at the detection position from the signal output from the oscillation circuit portion.

4. The detector as claimed in claim 1, wherein the electrode portion further comprises:
   a bracket formed of insulating material and installed inside the second electrode plate to support the second electrode plate; and
   a separator formed of insulating material and installed between the first electrode plate and the second electrode plate.

5. The detector as claimed in claim 1, wherein the electrode portion further comprises:

a support bar connecting the substrate and the first electrode plate and being coaxially positioned within the second electrode plate.

6. The detector as claimed in claim 5, wherein the support bar is formed of a conductive material.

7. A liquid level measuring apparatus of a printer, comprising:

a plurality of liquid level detectors, installed outside a container for storing liquid to be supplied to a developing apparatus of the printer at liquid level detecting positions set at predetermined intervals in a vertical direction, which detect a change in electrostatic capacity according to the presence of the liquid and output a corresponding signal; and a controller which controls each of the liquid level detectors so that the operation time of each of the liquid level detectors does not overlap, and which determines the level of the liquid stored in the container from the signal output from each of the liquid level detectors.

8. The apparatus as claimed in claim 7, wherein each of the liquid level detectors comprises:

an electrode portion including a substrate, a first electrode plate separated a predetermined distance from the substrate, a second electrode plate extending from the substrate to the first electrode plate and having an opening corresponding to the outer circumferential surface of the first electrode plate; and a liquid level detecting portion which detects the presence of the liquid at one of the detecting positions from a change in electrostatic capacity measured by the first and second electrode plates.

9. The apparatus as claimed in claim 8, wherein the first electrode plate comprises a disk.

10. The apparatus as claimed in claim 8, wherein the electrode portion further comprises:

a bracket formed of insulating material and installed inside the second electrode plate to support the second electrode plate; and a separator formed of insulating material and installed between the first electrode plate and the second electrode plate.

11. The apparatus as claimed in claim 8, wherein the liquid level detecting portion comprises:

an oscillation circuit portion which outputs an electric signal of a frequency corresponding to a change in electrostatic capacity of the first and second electrode plates; and a liquid level determining portion which determines the presence of the liquid at one of the detecting positions from the signal output from the oscillation circuit portion.

* * * * *